United States Patent
Heikes et al.

(10) Patent No.: US 7,865,839 B2
(45) Date of Patent: Jan. 4, 2011

(54) FOCUS STEALING PREVENTION

(75) Inventors: Brian Dean Heikes, Ashburn, VA (US); James A. Odell, Potomac Falls, VA (US)

(73) Assignee: AOL Inc., Dulles, VA (US)

( * ) Notice: Subject to any disclaimer, the term of this patent is extended or adjusted under 35 U.S.C. 154(b) by 1701 days.

(21) Appl. No.: 11/021,009

(22) Filed: Dec. 23, 2004

(65) Prior Publication Data
US 2005/0198589 A1 Sep. 8, 2005

Related U.S. Application Data

(60) Provisional application No. 60/549,938, filed on Mar. 5, 2004.

(51) Int. Cl.
G06F 3/00 (2006.01)
(52) U.S. Cl. ............... 715/805; 715/802; 715/807; 715/781; 715/767; 709/200
(58) Field of Classification Search ......... 715/802–805, 715/807, 781, 767; 709/200
See application file for complete search history.

(56) References Cited

U.S. PATENT DOCUMENTS

| | | | |
|---|---|---|---|
| 5,721,849 A | | 2/1998 | Amro |
| 6,005,575 A * | 12/1999 | Colleran et al. ............ 715/807 |
| 6,609,146 B1 * | 8/2003 | Slotznick .................... 709/200 |
| 6,907,447 B1 * | 6/2005 | Cooperman et al. ......... 709/203 |
| 6,961,906 B2 * | 11/2005 | Hansen et al. ............. 715/767 |
| 7,269,794 B2 * | 9/2007 | Martinez et al. ............ 715/758 |
| 2002/0080185 A1 * | 6/2002 | Boeuf ........................ 345/802 |
| 2004/0189712 A1 * | 9/2004 | Rundell ..................... 345/808 |
| 2006/0005142 A1 * | 1/2006 | Karstens .................... 715/767 |

* cited by examiner

Primary Examiner—William L Bashore
Assistant Examiner—Meseker Takele
(74) Attorney, Agent, or Firm—Finnegan, Henderson, Farabow, Garrett & Dunner, LLP

(57) ABSTRACT

One implementation provides monitoring a user's activity within a first window that is visible to the user in a graphical user interface (GUI), receiving notification of an incoming message intended for the user, and, upon receipt, opening a second window that is visible to the user in the GUI, the second window being distinct from any other window currently open in the GUI. When a predetermined condition is satisfied based upon the user's activity being monitored in the first window, the implementation further provides deactivating the first window in the GUI and activating the second window to provide the user with notification of the incoming message.

4 Claims, 10 Drawing Sheets

FOCUS STEALING PREVENTION

RELATED APPLICATION

The present application claims the benefit of the filing date of U.S. Provisional Application No. 60/549,938, which was filed on Mar. 5, 2004.

TECHNICAL FIELD

This description relates to regulating the interruption of processes resulting from initiation of messaging sessions by a remote party.

BACKGROUND

Irrespective of the application being used by a user, if an instant message (IM) arrives from another user with whom the user is not presently engaged in an open IM communications session, the user's activity within the application is interrupted immediately. This interruption occurs without consideration of the task currently being performed by the user, the relative importance of that task to receipt of an incoming IM, or information reflecting a user's preference or reluctance for interruption. As such, control over the intended recipient's activity resides largely, if not exclusively, with the message sender.

For example, a user may be having an instant messaging conversation with a first individual in one user interface (UI) window. While the user is typing a message to the first individual during the course of this conversation, a second individual may send the user a new instant message. If the user does not already have an open instant messaging conversation with the second individual, a new instant message UI window is created and opened on the user's machine. When this new window is opened, it may take active focus away from other UI windows. If the user had been typing a message to the first individual when the new UI window takes focus, further typing by the user will appear in this new UI window rather than the intended UI window.

SUMMARY

Various implementations are provided herein. One implementation provides monitoring a user's activity within a first window that is visible to the user in a graphical user interface (GUI), receiving notification of an incoming message intended for the user, and, upon receipt of the incoming message, opening a second window that is visible to the user in the GUI, the second window being distinct from any other window currently open in the GUI. When a predetermined condition is satisfied based upon the user's activity being monitored in the first window, the implementation further provides deactivating the first window in the GUI and activating the second window to provide the user with notification of the incoming message.

Various implementations may provide certain advantages. For example, a newly arriving instant message (IM) may be held in a queue until a rule is satisfied. The rule may be based upon user activity in a monitored window on a client device or may be based on other criteria determined by the user. In the example of a user actively working in the monitored window, the newly arriving IM is queued to minimize disruption of the user's task focus in the monitored window. When the user is no longer actively working in the monitored window, the new window is then activated to provide the user with a notification of the new IM. More generally, communications directed to an intended recipient, and activity by an intended recipient (e.g., input activity by the intended recipient such as typing) are monitored to control the creation of focus-owning windows.

DETAILED DESCRIPTION

Figure 1:
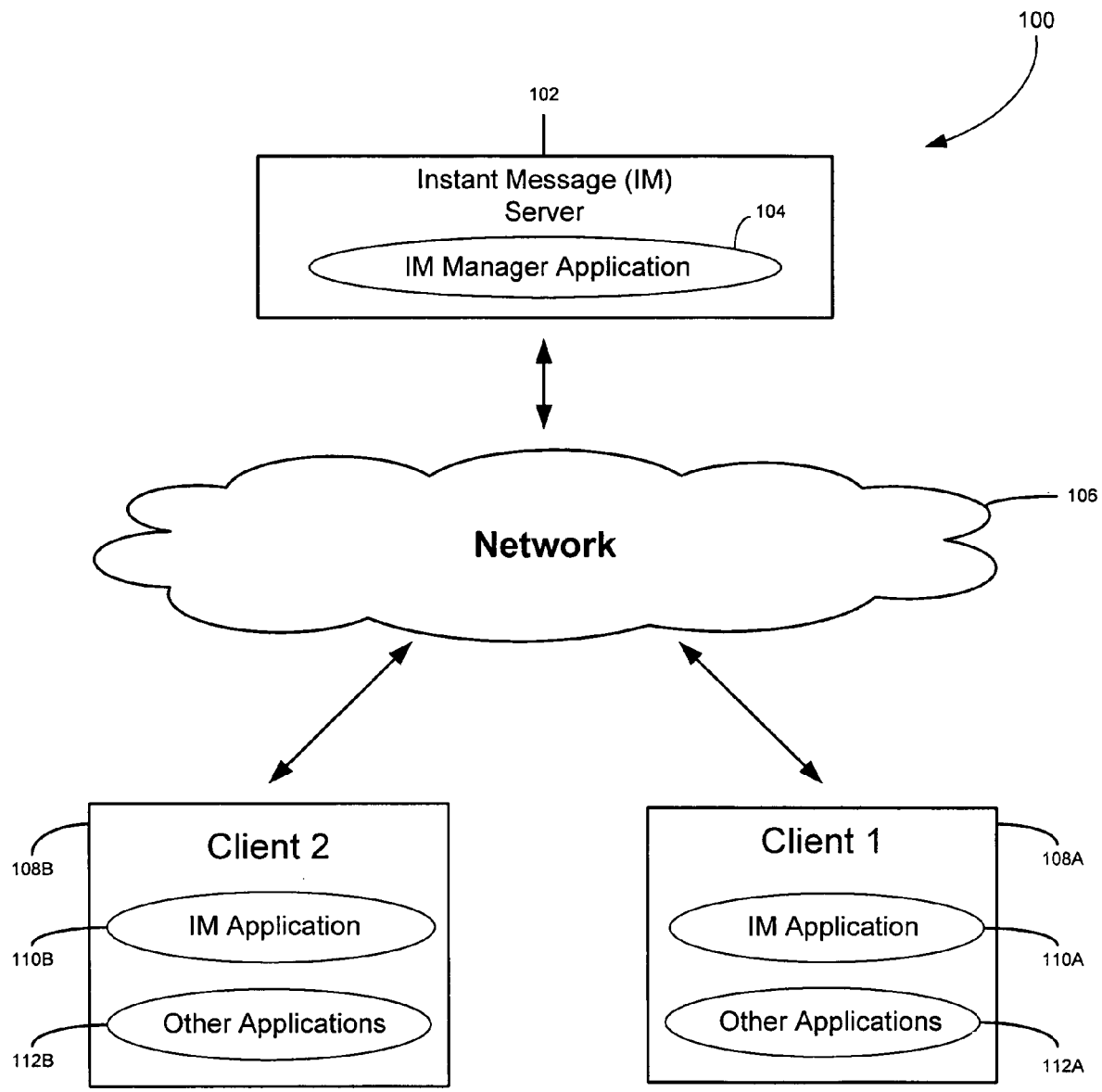
FIG. 1 is a block diagram of a networking system that is used for communication of instant messages, according to one implementation.

FIG. 1 is a block diagram of a networking system 100 that is used for transmission of instant messages, according to one implementation. In this implementation, the system 100 includes an instant message (IM) server 102, a network 106, and client devices 108A and 108B. The IM server 102 is coupled to both the client device 108A and the client device 108B through the network 106. In one implementation, the network 106 is a wide-area network (WAN), while in another implementation, the network 106 is a local-area network (LAN). The client devices 108A and 108B may each include a computing system, such as the computing system shown in FIG. 7.

During operation, the client device 108A may initiate an instant-messaging session with the client device 108B and send one or more IM's to the client device 108B during the instant-messaging session. To do so, the client device 108A invokes an IM application 110A. In one implementation, a first user manually invokes the IM application 110A. In another implementation, the client device 108A automatically invokes the IM application 110A at start-up. The client device 108A also may include various other applications 112A that operate at run-time, such as word-processing applications, web-browser applications, or mail applications. When a first user on the client device 108A wishes to begin an instant-messaging session with a second user on the client device 108B, the first user initiates a request. This request includes an address associated with the client device 108B.

The IM application 110A on the client device 108A sends this request to an IM manager application 104 on the IM server 102 using the network 106.

Upon receipt of this request from the client device 108A, the IM manager application 104 uses the address contained within the request to locate the client device 108B. The IM manager application 104 then routes the request to an IM application 110B on the client device 108B using the network 106. The IM application 110B then processes this request and initiates a new instant-messaging session with the IM application 110A on the client device 108A. The second user on the client device 108B is then notified by the IM application 110B of the new session, and the first and second users of the client devices 108A and 108B are capable of exchanging IM's during the course of the instant-messaging session. As shown in FIG. 1, the client device 108B also may contain other applications 112B, such as word-processing applications, web-browser applications, or mail applications.

In one implementation, the client device 108A is capable of sending messages to and receiving messages from the client device 108B through the network 106 without the use of the IM server 102. In this implementation, the IM applications 110A and 110B manage all of the IM functionality on the client devices 108A and 108B, respectively. Each of the IM applications 110A and 110B are capable of authenticating and locating other client devices to enable the exchange of messages to and from the client devices 108A and 108B, respectively.

Although instant messaging typically provides efficient, or instantaneous, exchange of IM's between the client devices 108A and 108B, such a capability need not be enabled to the complete disregard for users' activities on the client devices 108A and 108B. Rather, various preferences and criteria on the client devices 108A and 108B may be used in determining whether, when, and how to initiate instant-messaging sessions.

In one implementation, the client devices 108A and 108B utilize the IM server 102 to exchange non-streaming instant messages. In one implementation, the client devices 108A and 108B are capable of exchanging streaming instant messages as well. In this implementation, the messages can be processed as steady and continuous streams of information. In certain situations, a user may want to be immediately informed of any incoming, streamed data. In other situations, however, the user may want to prevent inactivation of a current, active window even when streaming data arrives. In these situations, the client devices 108A and 108B are capable of preventing the deactivation of the current window until a predetermined condition has been satisfied, such as when the user has finished typing in the current window (or when the user has not entered any input data within the current window for a certain period of time). When the predetermined condition is satisfied, the corresponding client device 108A or 108B then switches activation to another window and provides notification of the incoming, streamed data.

The client devices 108A and 108B may also allow users of these devices to engage in enhanced sessions that involve streaming-based multimedia communications. These enhanced sessions may include talk sessions, live video sessions, file transfer sessions, instant imaging sessions, and the like. Typically, the client devices 108A and 108B will directly communicate during these enhanced sessions using the network 106. However, one the client device 108A or 108B first sends an instant message to the other client device (using the IM server 102) to provide an invitation to participate in such an extended session. Once the client device 108A or 108B receives the invitation message, it can wait until a predetermined condition is satisfied before providing notification of the invitation message to a user within an activated window. The user may then accept the invitation to begin the extended session with another user.

Figure 2:
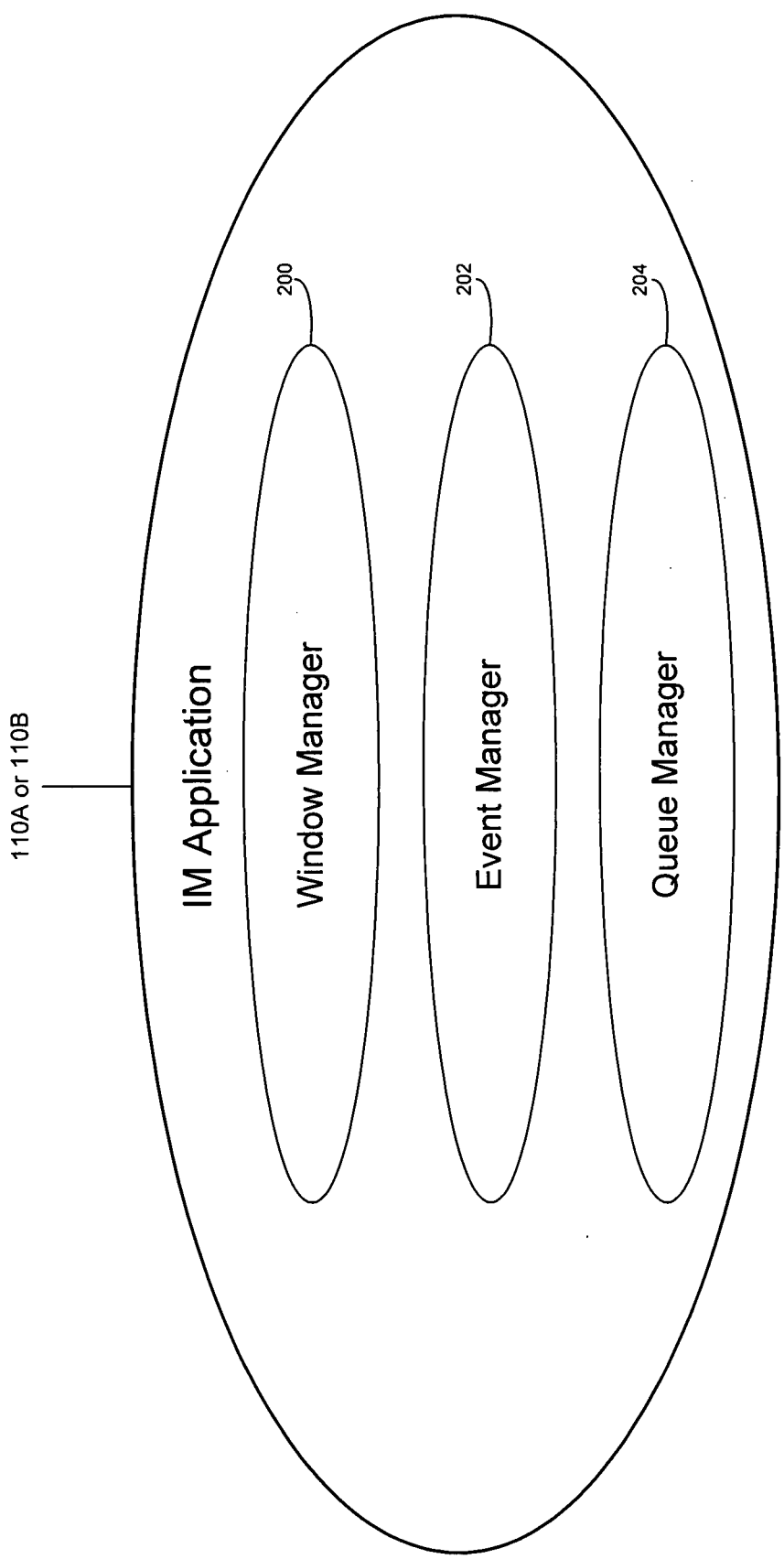
FIG. 2 is a block diagram of an instant message (IM) application shown in FIG. 1, according to one implementation.

FIG. 2 is a block diagram of one of the IM applications 10A or 110B from FIG. 1 shown in more detail, according to one implementation. In this implementation, the IM application 110A or 110B includes a window manager 200, an event manager 202, and a queue manager 204. These managers are used in managing instant-messaging sessions. When an incoming request to initiate an instant-messaging session is received by the IM application 110A or 110B, the request is processed by the event manager 202. The event manager 202 generates an event to announce the arrival of the request.

If the IM application 110A or 110B has been configured to immediately process the request, the window manager 200 processes the event from the event manager 202, opens a new window in a graphical user interface (GUI) on the corresponding client device, and activates the new window to display a notification of the incoming request. If, on the other hand, the IM application 110A or 110B has been configured to delay processing of the request according to a set of user-specified preferences and/or criteria, the queue manager 204 processes the event from the event manager 202 and places the incoming request in an IM queue or otherwise delays presentation of the message. When the event manager 202 and/or the queue manager 204 determine that a predetermined condition has been specified for the IM application 110A or 110B, the queue manager 204 removes the incoming request from the IM queue and invokes the window manager 200. The window manager 200 then activates a window in the GUI on the corresponding client device to display a notification of the incoming request. These processes are more fully described below in reference to FIG. 3A and FIG. 3B.

In an alternate implementation, an operating system running on either the client device 108A or 108B may manage the processes controlled by the window manager 200, the event manager 202, and the queue manager 204. In this implementation, the IM application 110A or 110B interacts with the operating system running on the respective client device 108A or 108B to process the flow of messages that are both sent and received and also the windows that are opened and activated.

Figure 3A:
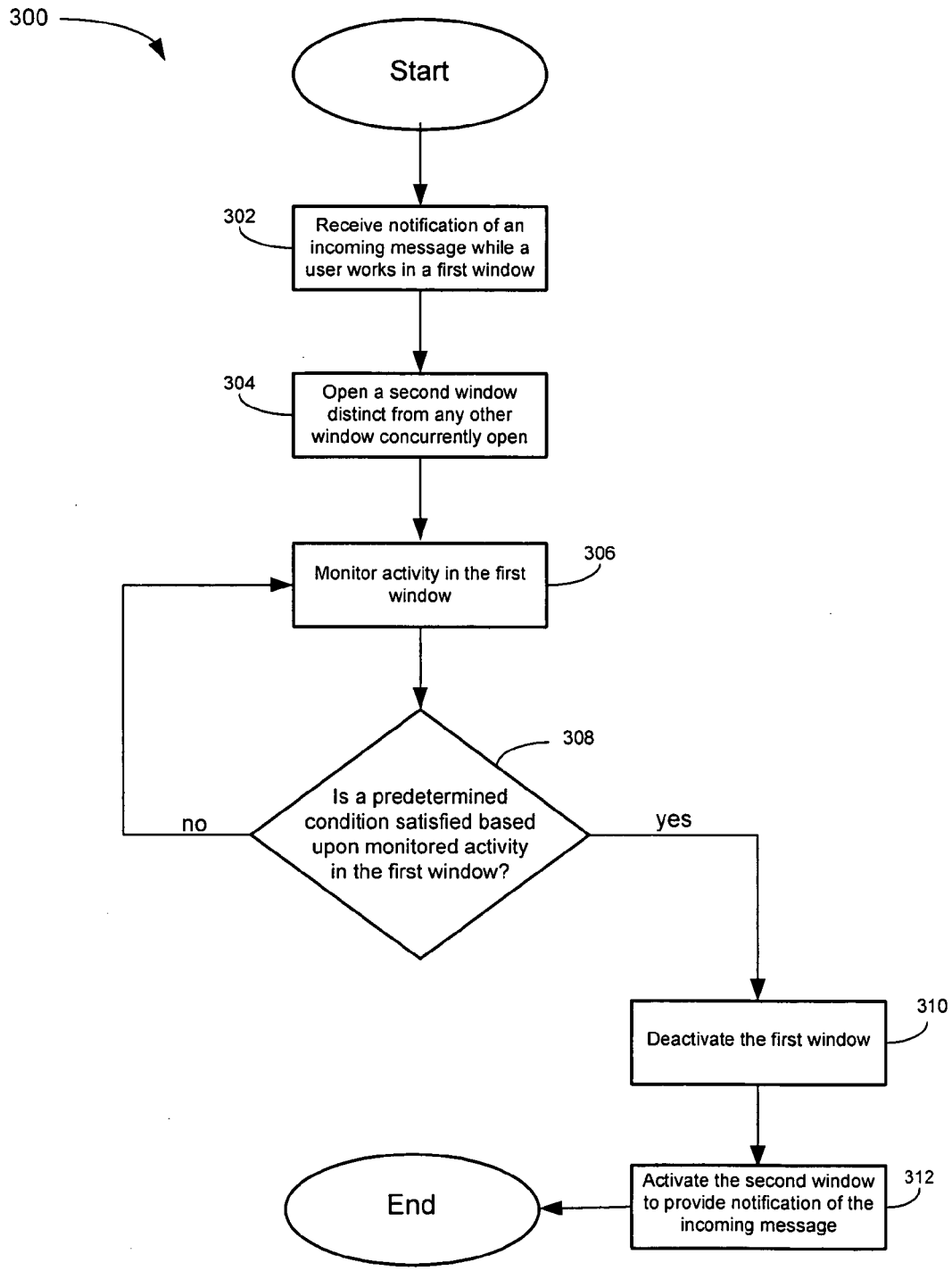
FIG. 3A is a flow diagram of a computer-implemented method for activating a window to provide notification of an incoming text message, according to one implementation.

FIG. 3A is a flow diagram of a computer-implemented method 300 for activating a window to provide notification of an incoming text message, according to one implementation. The method 300 is implemented by either of client device 108A or client device 108B shown in FIG. 1. In an act 302, the client device 108A or 108B receives notification of an incoming message, such as a text message, that is intended for a particular user while the user works in a first window. The first window is displayed to the user in a GUI, and contains contents of an operational application, such as a word-processing or messaging application. If the application is a messaging application, the client device 108A or 108B may also activate the first window. Upon receipt of the notification, the client device 108A or 108B automatically opens a second window in an act 304 that is visible to the user in the GUI. The second window is distinct from the first window and also from any other window currently open in the GUI. For example, if the second window is a browser window tasked with loading graphical or textual content that has been created and opened by a browser-based application, it is distinct from any other browser windows that have also been created and opened within the GUI by the same browser-based application. The second window is also distinct from other windows that have been created and opened with the GUI by other applications, such as word-processing applications or spreadsheet applications.

In an act 306, the client device 108A or 108B continually monitors the user's activity within the first window. At a checkpoint 308, the client device 108A or 108B determines whether a predetermined condition has been satisfied based upon the user's activity being monitored in the first window. For example, the predetermined condition may be satisfied if the user's activity is idle within the first window or if the user has not typed within the first window in a certain threshold number of seconds (e.g., three seconds). In another example, the predetermined condition is satisfied once the user has finished working on a particular document within the first window and has closed out of this document. In another example, the predetermined condition is satisfied when the user has been continually typing within the first window for a predefined number of seconds (e.g., sixty seconds). (The client device 108A or 108B may determine that the user is continually typing within the first window by determining that there are no more than a specified number of seconds of idle time in between successive keystrokes by the user.) In this example, the client device 108A or 108B may decide to interrupt the user's typing after having waited the predefined number of seconds.

In another example, the predetermined condition is satisfied if the incoming message has been sent from a particular individual, such as a manager or director. In this example, the user may wish to be immediately notified of an incoming message that has been sent by the user's manager or by another individual of interest. The client device 108A or 108B is capable of identifying the source of the incoming message and comparing the source to a set of preexisting references, such as source message or email addresses. The predetermined condition is satisfied if the client device 108A or 108B identifies a match upon comparison. In one implementation, the client device 108A or 108B generates a default set of preexisting references based upon role types (e.g., managers, directors, employees, etc.) and relationships between these role types. In one implementation, the user is capable of defining and customizing one or more of the preexisting references.

Any number of different predetermined conditions may be specified or configured on the client device 108A or 108B. In one implementation, the client device 108A or 108B queues the incoming message until the predetermined condition is satisfied.

If the predetermined condition has not been satisfied, the client device 108A or 108B repeats the act 306. If, however, the predetermined condition has been satisfied, the client device 108A or 108B deactivates the first window in an act 310. Subsequently, in an act 312, the client device 108A or 108B activates the second window to provide the user with notification of the incoming message. The incoming message is displayed in the GUI within the second window.

Figure 3B:
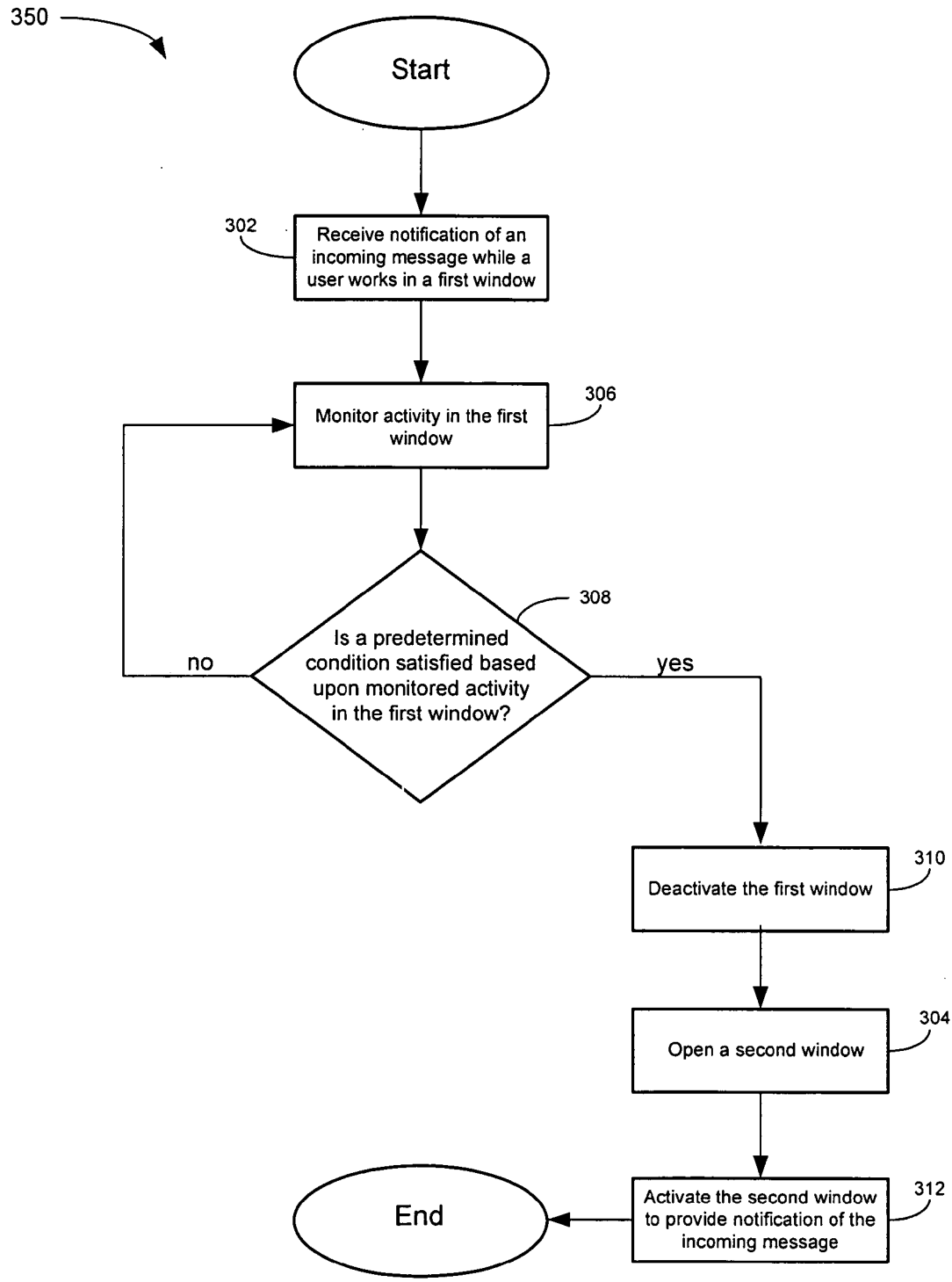
FIG. 3B is a flow diagram of a computer-implemented method for activating a window to provide notification of an incoming text message, according to another implementation.

FIG. 3B is a flow diagram of a computer-implemented method 350 for activating a window to provide notification of an incoming message, according to another implementation. The method 350 is implemented by either the client device 108A or the client device 108B shown in FIG. 1, such that the ordering of the respective acts is different than shown in FIG. 3A. In the act 302, the client device 108A or 108B receives notification of an incoming message, such as a text message, that is intended for a particular user while the user works in a first window. The first window is displayed to the user in a GUI, and contains contents of an operational application, such as a word-processing or messaging application. If the application is a messaging application, the client device 108A or 108B may also activate the first window.

In the act 306, the client device 108A or 108B continually monitors the user's activity within the first window. At a checkpoint 308, the client device 108A or 108B determines whether a predetermined condition has been satisfied based upon the user's activity being monitored in the first window. For example, the client device 108A or 108B may determine that the predetermined condition has been satisfied if the user is not currently typing within the first window, or alternatively if the user has not typed any input within the first window in the last three seconds. Any number of different predetermined conditions may be specified or configured on the client device 108A or 108B. In one implementation, the client device 108A or 108B queues the incoming message until the predetermined condition is satisfied.

If the predetermined condition has not been satisfied, the client device 108A or 108B repeats the act 306. If, however, the predetermined condition has been satisfied, the client device 108A or 108B deactivates the first window in the act 310. Subsequently, in the act 304, the client device 108A or 108B automatically opens a second window that is visible to the user in the GUI. In one implementation, the second window is distinct from the first window and also from any other window currently open in the GUI. For example, if the second window is a browser window tasked with loading graphical or textual content that has been created and opened by a browser-based application, it is distinct from any other browser windows that have also been created and opened within the GUI by the same browser-based application. The second window is also distinct from other windows that have been created and opened with the GUI by other applications.

In the act 312, the client device 108A or 108B activates the second window to provide the user with notification of the incoming message. The incoming message is displayed in the GUI within the second window.

Figure 4A:
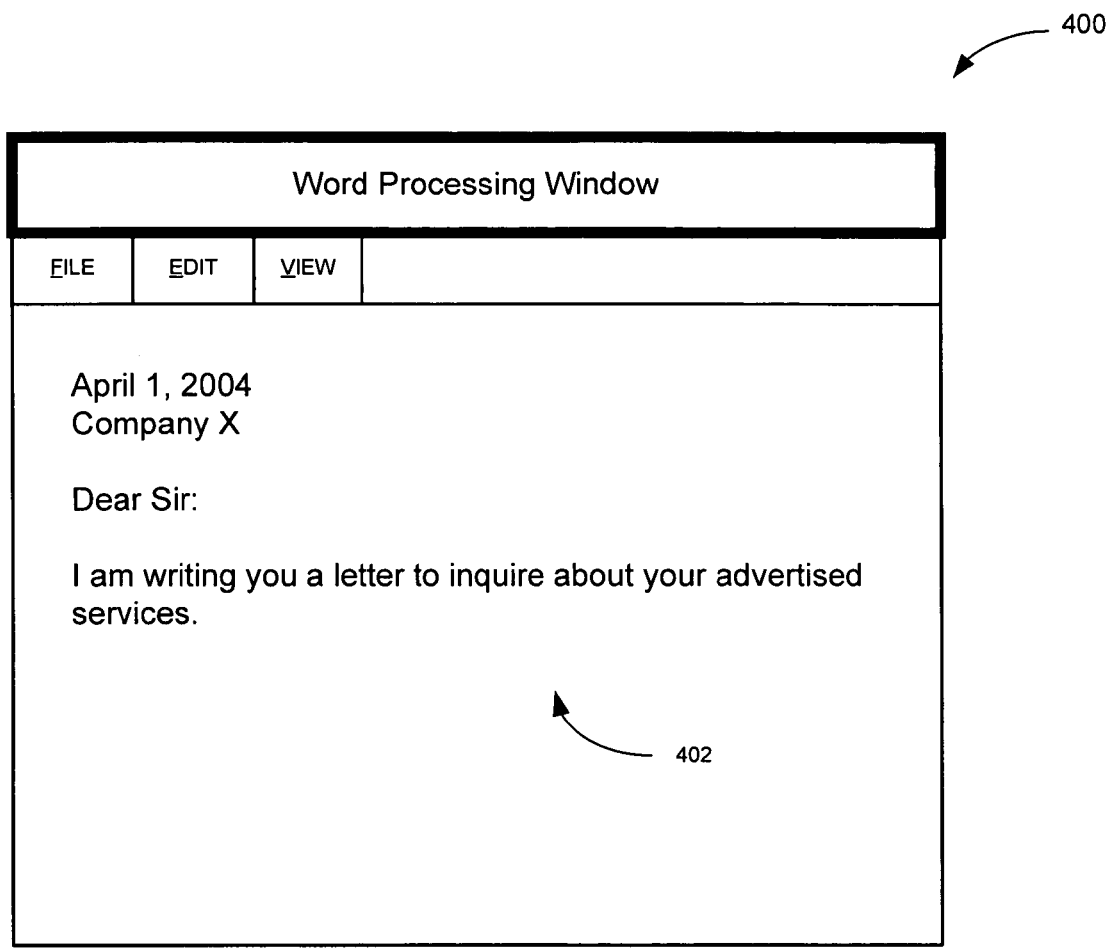
FIG. 4A is a screen diagram of a graphical user interface (GUI) containing a word-processing window, according to one implementation.

FIG. 4A is a screen diagram of a graphical user interface (GUI) containing a word-processing window 400, according to one implementation. In this implementation, the word-processing window 400 is displayed to a user on either the client device 108A or 108B and represents an active window within which user data is directed. The word-processing window 400 contains a set of standard menus, such as "FILE", "EDIT", and "VIEW". Using a text-entry area 402, the user may type in one or more characters into a document, such as the letter shown in FIG. 4A.

When the word-processing window 400 is active, the client device 108A or 108B monitors the user's activity in the word-processing window 400, as described earlier with respect to the action 306 in FIG. 3A or FIG. 3B. In one implementation, a word-processing application monitors this activity. The word-processing application may also manage the activation and deactivation of the word-processing window 400. In another implementation, the IM application 110A or 110B monitors the activity in the word-processing window 400. In this implementation, the IM application 110A or 110B monitors the user's activity to determine if the flow of the user's activity within the word-processing window 400 is to be interrupted by incoming messages. In yet another implementation, the operating system on the client device 108A or 108B monitors the user's activity in the word-processing window 400 and communicates with the corresponding IM application 110A or 110B.

Figure 6:
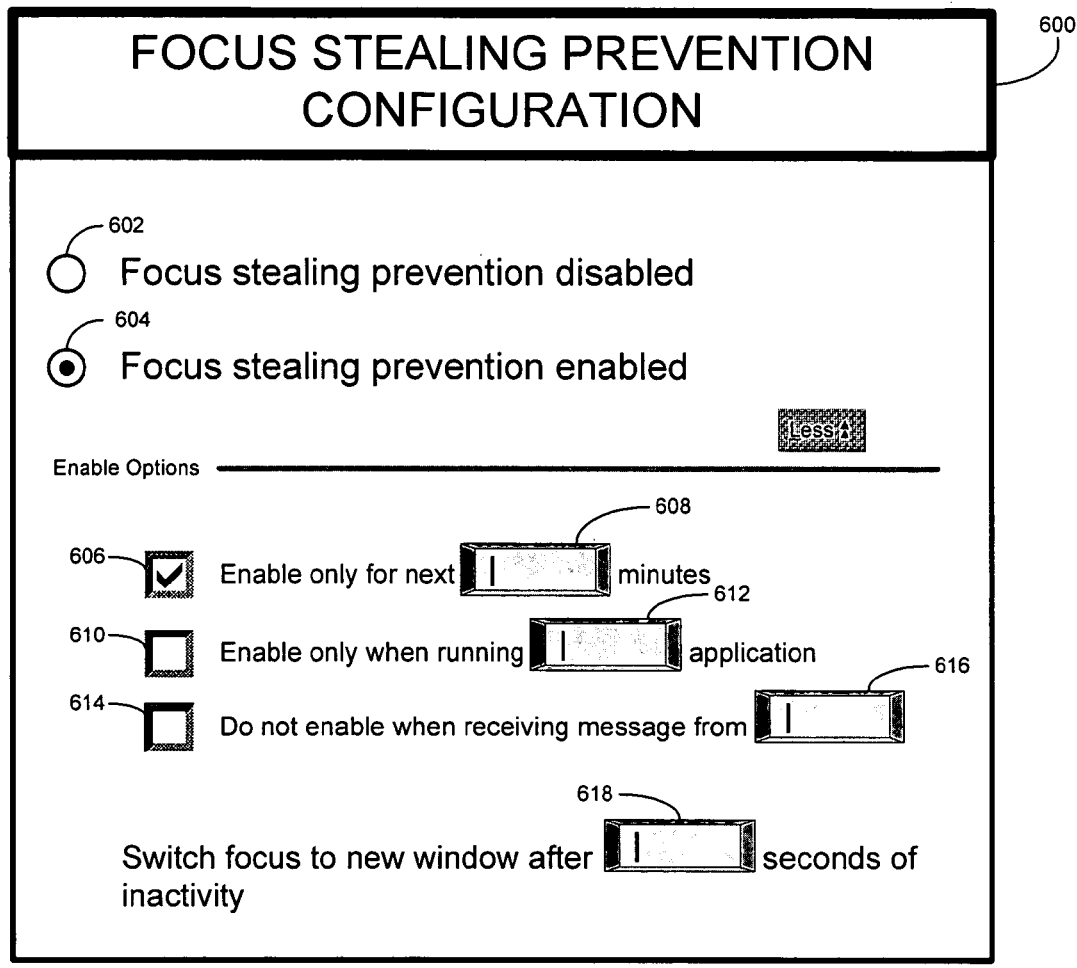
FIG. 6 is a screen diagram of a GUI containing a configuration window, according to one implementation.

When a new message arrives for the user on the client device 108A or 108B, the corresponding IM application 110A or 110B receives notification of the newly arrived message. According to one implementation, the client device 108A or 108B opens a new window that is distinct from the word-processing window 400 and from any other window currently open in the GUI. The client device 108A or 108B then determines if a predetermined condition is satisfied based upon the monitored activity in the word-processing window 400. Various examples of predetermined conditions that may be tested were described previously in reference to FIG. 3A and FIG. 3B. The predetermined condition may be defined and customized by the user to specifically address the user's needs and desires. (FIG. 6 shows one example of a GUI that may be used to configure various forms of predetermined conditions.)

Figure 4B:
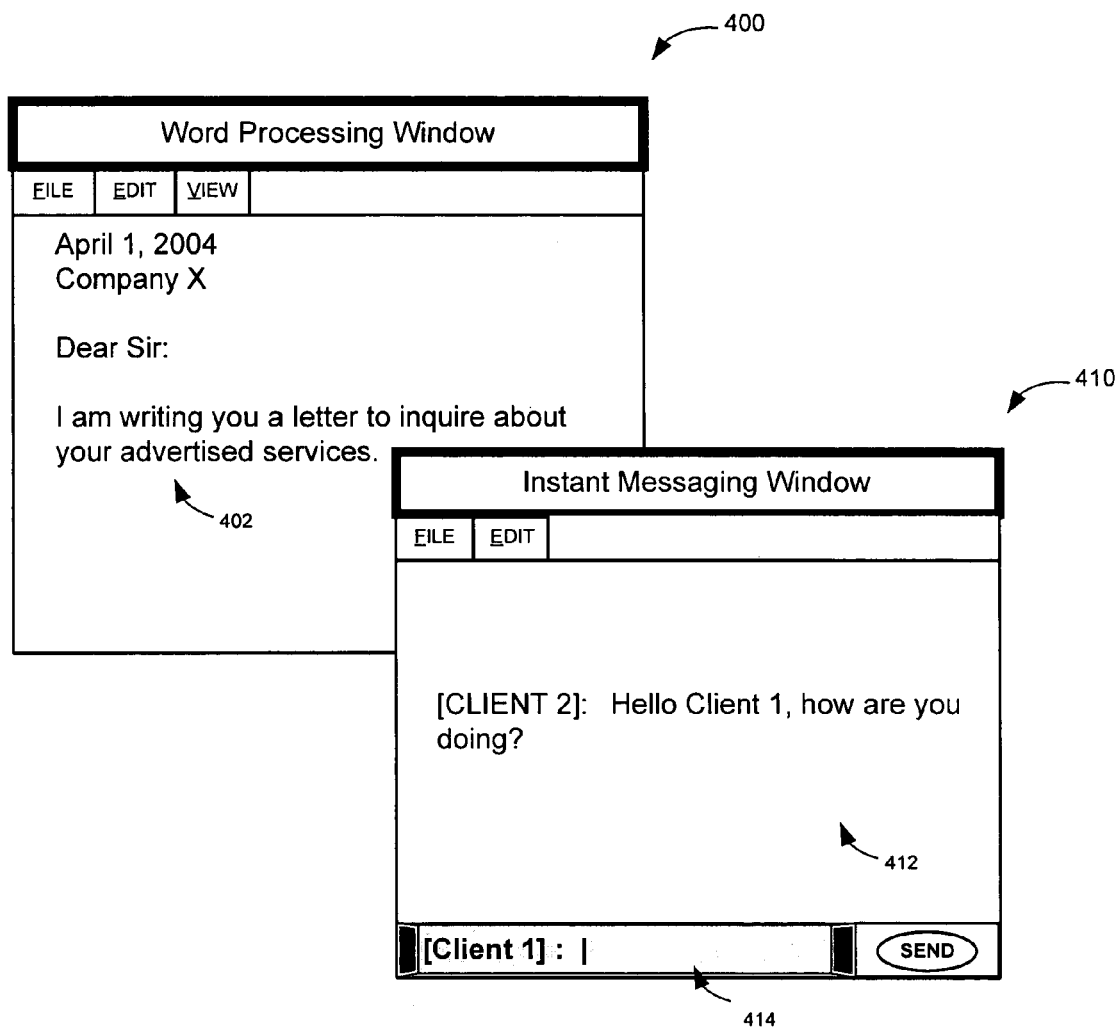
FIG. 4B is a screen diagram of a GUI containing the word-processing window shown in FIG. 4A and an instant-messaging window.

When the predetermined condition is satisfied, the client device 108A or 108B deactivates the word-processing window 400 and activates a new messaging window 410, which is shown in FIG. 4B. The new messaging window 410 provides the user with notification of the incoming text message. As is shown in FIG. 4B, the messaging window 410 is the active window and is displayed in front of the word-processing window 400. If the user begins typing text, the text will be input into and displayed in a window area 414 of the messaging window 410, and not into the area 402 of the word-processing window 400. This functionality highlights one of the advantages of the implementation shown in FIG. 4B. The messaging window 410 becomes activated only when the specified predetermined condition is satisfied. For example, if the predetermined condition is not satisfied until the user's activity is idle within the word-processing window 400, the user does not need to worry that user input will be inadvertently entered into the window area 414 of the messaging window 410. The messaging window 410 remains inactive while the user enters input into the word-processing window 400.

In one alternate implementation, the messaging window 410 becomes active when the user has continually entered input into the word-processing window 400 for a predetermined amount of time. For example, if the user has been continually typing data into the area 402 of the word-processing window 400 for thirty seconds, the client device 108A or 108B may interrupt the user's activity in the window 400 and activate the messaging window 410 to ensure that the user is notified of the incoming message. In this implementation, further typing that is presumably directed toward the window 400 may be buffered rather than being directed to the window 410. Alternatively, the notification may simply be presented without interruption of the window 400, for instance, by visual modification of the window 400 or presentation of the window 410 in the background (though visible) while maintaining focus within the window 400. The window 400 may be resized to accommodate visual perception of the window 410, if necessary.

A window area 412 displays to the user the text of the received message. As is shown in FIG. 4B, a remote user named "Client 2" has sent a message to the user, who is named "Client 1". The user may respond to "Client 2" by typing in a message into the window area 414 and then selecting the "SEND" button.

In the implementation shown in FIG. 4B, the messaging window 410 is created and activated when a new text-messaging session is initiated between "Client 2" and "Client 1". As is shown in the messaging window 410, the window area 412 contains the first message from "Client 2" that is part of the new text-messaging session. The user named "Client 1" may type in messages to "Client 2" within the window area 414. All subsequent messages received from "Client 2" will then be displayed to "Client 1" within the window area 412. The window area 412 may also include a scroll bar (not shown) to allow "Client 1" to see all of the messages that have been received from "Client 2" during the messaging session.

Figure 4C:
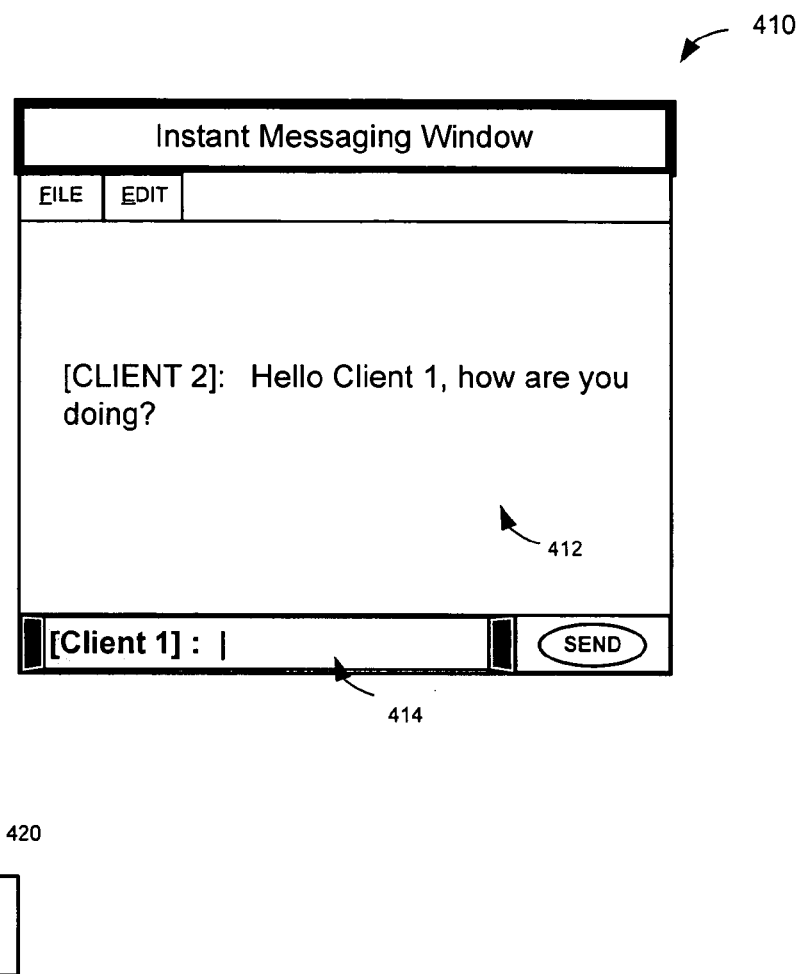
FIG. 4C is a screen diagram of a GUI containing a minimized icon of the word-processing window shown in FIG. 4B and also the instant-messaging window shown in FIG. 4B.

In an alternate implementation, the word-processing window 400 may also be minimized within the GUI after it had been deactivated. FIG. 4C shows an icon 420 that is a minimized version of the word-processing window 400 after it has been deactivated. The messaging window 410 shown in FIG. 4C is the active and open window in the GUI. In one implementation, all windows in the GUI other than the messaging window 410 are deactivated and minimized after the messaging window 410 has been opened and activated.

Figure 5:
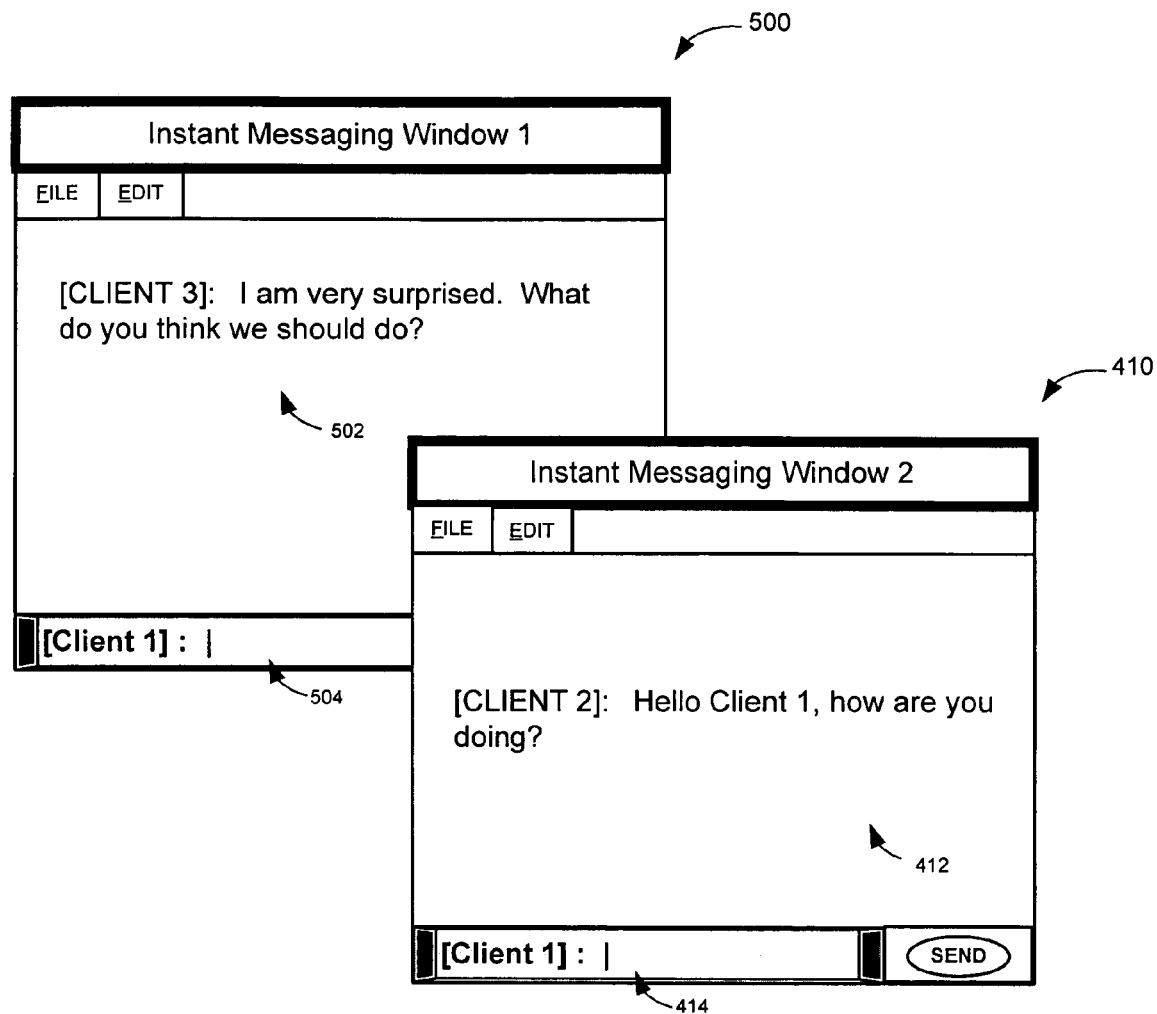
FIG. 5 is a screen diagram of a GUI containing two instant-messaging windows.

Various instant-messaging windows may also be managed and displayed within the GUI of the client device 108A or 108B. For example, a user named "Client 1" on the client device 108A may be involved in a messaging session with another use named "Client 3". FIG. 5 shows a messaging window 500 that corresponds to this messaging session between "Client 1" and "Client 3". All messages received from "Client 3" during this session are displayed in a window area 502 of the window 500. "Client 1" is able to enter messages to be sent to "Client 3" in a window area 504, in which textual input is accepted from "Client 1". During this session, another user named "Client 2" may wish to initiate a brand new, and separate, instant messaging session with "Client 1". "Client 2" may be using a remote client device, such as the client device 108B. When the client device 108A receives notification of an incoming text message from "Client 2" on the client device 108B, the client device 108A determines is a predetermined condition is satisfied based upon activity in the messaging window 500. If one of the previously described predetermined conditions is satisfied, the client device 108A may deactivate the messaging window 500. Subsequently, the new messaging window 410 is activated to provide notification to "Client 1" of the incoming text message sent from "Client 2". This message is displayed within the window area 412. The messaging window 410 may be opened either before or after the messaging window 500 is deactivated, depending on whether the method shown in FIG. 3A of FIG. 3B is performed by the client device 108A.

In one implementation, the client device 108A sends information to "Client 2" on the client device 108B relating to a status of the activation of the messaging window 410. This information indicates whether the messaging window 410 has become activated. A GUI on the client device 108B may then provide "Client 2" with a visual indication of the status of the new messaging session with "Client 1". For example, if "Client 1" is actively typing within the messaging window 500 shown in FIG. 5, the new messaging window 410 may not become activated. In this case, the client device 108A sends information to the client device 108B indicating that the messaging window 410 is not yet active. The GUI on the client device 108B then provides a visual indication to "Client 2" to indicate that the new messaging session with "Client 1" has not yet been initiated. Once the client device 108A has activated the messaging window 410, it sends information to the client device 108B indicating that the window has become active. The GUI on the client device 108B then provides a visual indication to "Client 2" that the new messaging session with "Client 1" has been initiated. The visual indication may be an icon or a textual phrase (e.g., "Session is now active") that indicates the updated status.

When the window 410 is active, "Client 3" may send another message to "Client 1" for the existing session between these two clients. In this situation, the client device 108A may determine if a predetermined condition (such as one of those described earlier) is satisfied with regard's to the activity of "Client 1" within the window 410. If the condition is satisfied, the client device 108A may deactivate the window 410 and then activate the window 500. Once the window 500 becomes activated, the message text sent from "Client 3" is displayed within the window area 502. If the condition is not satisfied, the client device 108A maintains the activation of the window 410. In one implementation, the message text sent from "Client 3" is displayed within the window area 502 even if the window 500 is deactivated. As a result, "Client 1" can have messaging sessions with multiple other clients by using multiple windows (such as the windows 410 and 500) within the GUI. The client device 108A manages the activation and deactivation of the windows 410 and 500 depending on the user's activities within these windows and the arrival of incoming messages. In one implementation, the client device 108A minimizes (or iconifies) the window (410 or 500) that becomes deactivated within the GUI.

A user of the client device 108A or 108B may configure, or customize, the way in which windows are deactivated and activated when new instant messages arrive. For example, the user may define the predetermined condition that is to be satisfied before a new messaging window becomes activated. FIG. 6 is a screen diagram of a GUI containing a configuration window 600 that is displayed when the user wishes to customize various settings, according to one implementation. By selecting the radio button 604 in the configuration window 600, the user is able to enable the feature named "focus stealing prevention". By enabling this feature, the user is able to cause the GUI to prevent the deactivation of a currently open window and the activation of a new window (i.e., to prevent focus stealing) until a predetermined condition is satisfied, as shown and described in FIG. 3A and FIG. 3B, for instance. For example, if the user has enabled this feature (as shown by the selection in FIG. 6), the GUI will prevent a new messaging window, such as the messaging window 410 shown in FIG. 4B and FIG. 5, from becoming activated until a predetermined condition is satisfied based upon user activity in a monitored window, such as the window 400 shown in FIG. 4B or the window 500 shown in FIG. 5. If, on the other hand, the user selects a radio button 602, the feature of focus stealing prevention is disabled. When the feature is disabled, the GUI will open and activate a new messaging window as soon as a new instant message arrives from a remote user. In certain instances, a user may select the radio button 602 to temporarily or permanently disable the feature for focus stealing prevention if the user wants to receive notification of instant messages as soon as they arrive, irrespective of the user's then-current activity.

The configuration window 600 also includes various options that may be selected by the user if the feature for focus stealing prevention is enabled. These options are shown within the window 600 when the user has selected the radio button 604 to enable this feature. If the user selects a check-box 606, the feature of focus stealing prevention is enabled only for a specified number of minutes. The user may input the number of minutes within a text-box 608. The user may select this option to temporarily enable the feature. After the specified number of minutes have elapsed, the feature will automatically become disabled.

If the user selects a check-box 610, the feature of focus stealing prevention is enabled only when running a specified application. The user may specify the application by entering data into a text-box 612. The user may select this option if the user wants to be immediately notified of any incoming messages except when running a particular application, such as a high-priority word-processing application. When this application is operational, the focus stealing prevention feature will be enabled, such that a new window for an incoming message will not be activated until a predetermined condition is satisfied based upon the user's activity in a window associated with the specified application. In one implementation, the user may be able to specify multiple application names within the text-box 612.

If the user selects a check-box 614, the feature of focus stealing prevention is disabled when messages are received from a specified individual. The user may specify the name of this individual by entering data into a text-box 616. In certain instances, the user may want to receive immediate notification of any incoming messages that are sent from a particular individual. If the user selects the radio button 604, the check-box 614, and specifies the individual's address or name in the text-box 616, an incoming message sent from that individual will be immediately displayed in a window to the user. However, incoming messages sent from other individuals will be displayed only when a predetermined condition is satisfied based upon the user's activity within the GUI.

In one implementation, when the user selects the radio button 604 to enable the focus stealing prevention feature, the client system 108A or 108B monitors the user's activity within a first window of the GUI and activates a new window to provide notification of an incoming message after detecting inactivity in the first window for a predetermined period of time. For example, if one of the previously described predetermined conditions is satisfied with respect to the user's activity within the first window, the new window may be activated to provide notification of the incoming message. In this case, the focus is switched from the first window to the new window. If the user wishes to change the amount of time of inactivity that is required before focus is switched, the user may do so by entering data into a text-box 618 of the configuration window 600.

The various buttons, boxes, and other options shown in the configuration window 600 of FIG. 6 are only examples of the types of options that may be configured by the user. In various other implementations, the user may customize the options for the focus stealing prevention feature using many different menus, buttons, windows, or other mechanisms.

Figure 7:
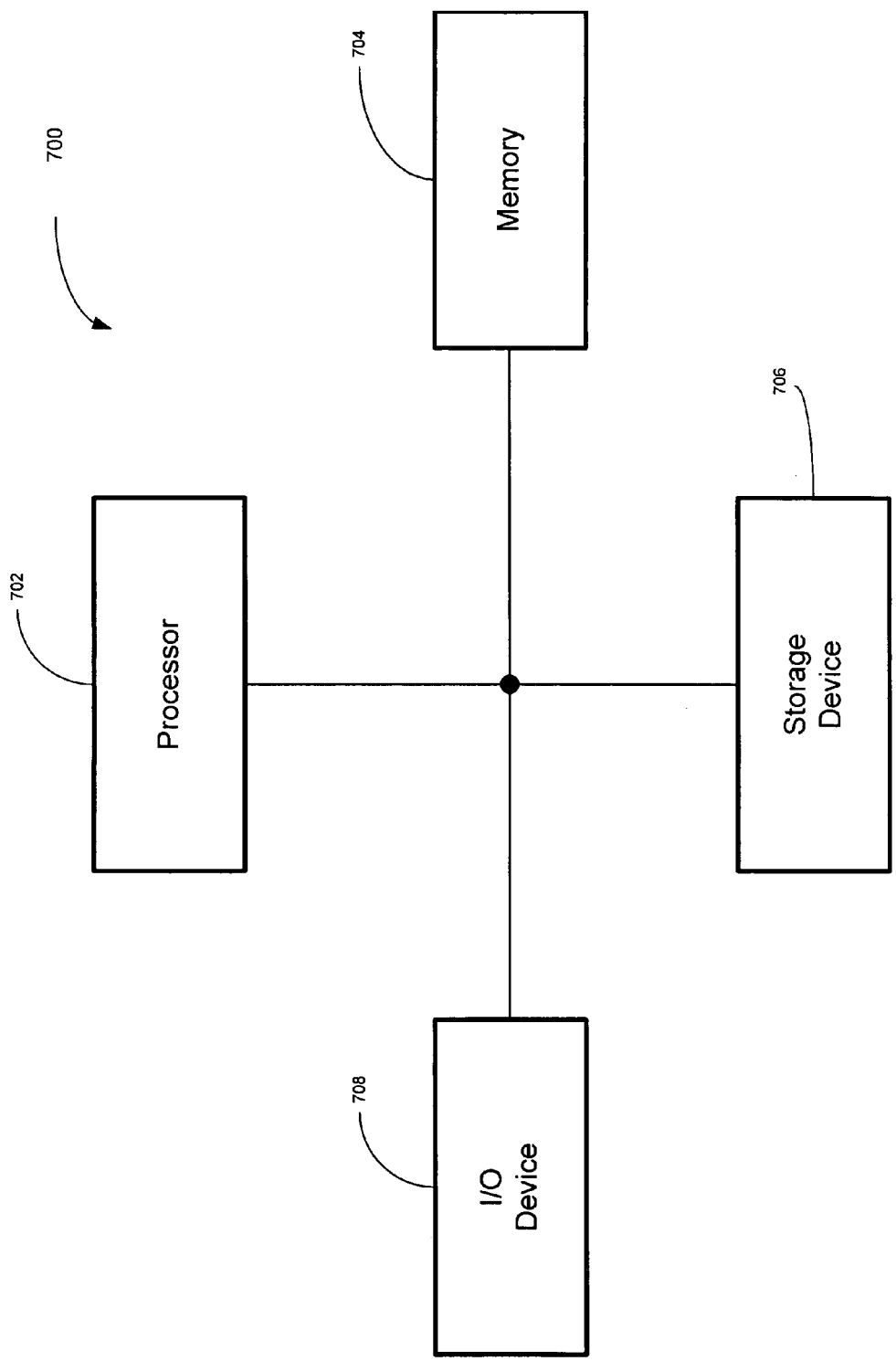
FIG. 7 is a block diagram of a computing system contained within the client devices shown in FIG. 1, according to one implementation.

FIG. 7 is a block diagram of a computing system 700 contained within each of the client devices 108A and 108B shown in FIG. 1, according to one implementation. This computing system 700 may be utilized to display the various GUI's shown in the preceding figures. In the example shown in FIG. 7, the computing system 700 includes a processor 702, a memory 704, a storage device 706, and an input/output device 708. Each of the components 702, 704, 706, and 708 are interconnected using a system bus. The processor 702 is capable of processing instructions for execution within the computing system 700. In one implementation, the processor 702 is a single-threaded processor. In another implementation, the processor 702 is a multi-threaded processor. The processor 702 is capable of processing instructions stored in the memory 704 or on the storage device 706 to display graphical information for a GUI on the input/output device 708. The processor 702 is also capable of executing the IM application 110A or 110B and the other applications 112A or 112B shown in FIG. 1.

The memory 704 stores information within the computing system 700. In one implementation, the memory 704 is a computer-readable medium. In one implementation, the memory 704 is a volatile memory unit. In another implementation, the memory 704 is a non-volatile memory unit.

The storage device 706 is capable of providing mass storage for the computing system 700. In one implementation, the storage device 706 is a computer-readable medium. In various different implementations, the storage device 706 may be a floppy disk device, a hard disk device, an optical disk device, or a tape device.

The input/output device 708 provides input/output operations for the computing system 700. In one implementation, the input/output device 708 includes a keyboard and/or pointing device. In this implementation, a user may use the keyboard to type in text messages that may be sent to a remote client device. In one implementation, the input/output device 708 includes a display unit for displaying the various GUI's shown in the preceding figures.

In one implementation, the computing system 700 is included within a handheld device. In another implementation, the computing system 700 includes a network adaptor to provide a wireless interface to the network 106 shown in FIG. 1.

A number of implementations have been described above. Nevertheless, it will be understood that various modifications may be made without departing from the spirit and scope of the description. Accordingly, other implementations are within the scope of the following claims.

What is claimed is:

1. A computer-implemented method, comprising:
    monitoring a user's activity within a first window that is visible to the user in a graphical user interface (GUI) and that is active;
    receiving a notification of an incoming message that was sent by another user and that is intended for the user;
    determining, based on an identity associated with sender of the incoming message, whether to interrupt the user's activity in response to receipt of the incoming message;
    if it is determined, based on the identity associated with the sender of the incoming message, that the user's activity is not to be interrupted in response to receipt of the incoming message:
        determining, based upon informing gleaned by monitoring the user's activity in the first window in the GUI, if the user's activity in the first window in the GUI satisfies a predetermined condition, and
        only after a determination that the user's activity in the first window in the GUI has satisfied the predetermined condition:
            automatically causing the first window in the GUI to transition from being active to being inactive, and
            automatically causing a second window to become active in the GUI to provide the user with notification of the incoming message; or
    if it is determined, based on the identity associated with the sender of the incoming message, that the user's activity is to be interrupted in response to receipt of the incoming message:
        automatically causing the first window in the GUI to transition from being active to being inactive, and
        automatically causing a second window to become active in the GUI to provide the user with notification of the incoming message.

2. The computer implemented method of claim 1, wherein determining, based upon informing gleaned by monitoring the user's activity in the first window in the GUI, if the user's activity in the first window in the GUI satisfies a predetermined condition includes determining that the user's activity in the first window in the GUI satisfies the predetermined if there has been no user activity in the first window for a predetermined amount of time.

3. A computer-implemented method, comprising:
    receiving a notification of an incoming message that is intended for a user and that is from another user;
    determining that a first window that is visible to the user in a graphical user interface (GUI) presently is active;
    after receiving the notification of the incoming message, delaying notification of the incoming message until the user's interaction with the presently active first window satisfies a predetermined condition;
    monitoring the user's interaction with the presently active first window;
    determining that a predetermined amount of time has elapsed since receiving the notification of the incoming message without the predetermined condition having been satisfied; and
    in response to determining that the predetermined amount of time has elapsed since receiving the notification of the incoming message without the predetermined condition having been satisfied, automatically providing an indication to the other user that the user has not yet received notification of the incoming message.

4. The method of claim 3 further comprising:
    after providing the indication to the other user that the user has not yet received notification of the incoming message and based on monitoring the user's interaction with the presently active first window, determining that the user's interaction with the presently active first window has satisfied the predetermined condition; and
    in response to determining that the user's interaction with the presently active first window has satisfied the predetermined condition:
        automatically causing the presently active first window to transition from being active to being inactive, and
        automatically causing a second window to become active in the GUI to provide the user with notification of the incoming message.

* * * * *